US010430206B1

(12) United States Patent
Hoffmann

(10) Patent No.: US 10,430,206 B1
(45) Date of Patent: Oct. 1, 2019

(54) MULTI-USER HIDDEN FEATURE ENABLEMENT IN FIRMWARE

(71) Applicant: American Megatrends, Inc., Norcross, GA (US)

(72) Inventor: Matthew Hoffmann, Duluth, GA (US)

(73) Assignee: American Megatrends International, LLC, Norcross, GA (US)

( * ) Notice: Subject to any disclaimer, the term of this patent is extended or adjusted under 35 U.S.C. 154(b) by 238 days.

(21) Appl. No.: 15/458,356

(22) Filed: Mar. 14, 2017

(51) Int. Cl.
*G06F 9/44* (2018.01)
*G06F 9/445* (2018.01)
*G06F 21/62* (2013.01)
*G06F 9/4401* (2018.01)

(52) U.S. Cl.
CPC ........ *G06F 9/44505* (2013.01); *G06F 21/629* (2013.01); *G06F 9/4406* (2013.01)

(58) Field of Classification Search
CPC .... G06F 9/44502; G06F 9/44508; G06F 1/24; G06F 9/44526; G06F 15/177; G06F 9/44514; G06F 9/44523; G06F 11/1417; G06F 9/44505
See application file for complete search history.

(56) References Cited

U.S. PATENT DOCUMENTS

| | | | | |
|---|---|---|---|---|
| 8,775,781 | B2 * | 7/2014 | Warkentin | G06F 9/441 713/2 |
| 9,734,311 | B1 * | 8/2017 | Righi | G06F 21/31 |
| 2014/0281577 | A1 * | 9/2014 | Nicholes | G06F 21/71 713/189 |
| 2015/0089238 | A1 * | 3/2015 | Lewis | G06F 21/44 713/183 |

* cited by examiner

*Primary Examiner* — Zahid Choudhury
(74) *Attorney, Agent, or Firm* — Newport IP, LLC Shigeta | Hope

(57) ABSTRACT

A firmware can include multiple features for multiple users enabled based on the presence of authenticated variables. When attempting to access functionality of a feature, the firmware will check for the presence of an authenticated variable corresponding to the feature. The authenticated variable for the feature may be installed by a user. The firmware may data to enable a feature that includes an authenticated variable for enabling the feature and an authenticated variable corresponding to an end-user of the firmware. If the firmware has access to the end-user authenticated variable, the feature authenticated variable is installed.

20 Claims, 6 Drawing Sheets

MULTI-USER HIDDEN FEATURE ENABLEMENT IN FIRMWARE

BACKGROUND

It is not uncommon for an original equipment manufacturer ("OEM") to develop and manufacture different versions of the same computer system motherboard. These different versions of the same computer system motherboard are commonly referred to as "platforms." For example, multiple versions of a server motherboard can be developed that have many hardware components, such as a chip set, in common. These different versions of the same motherboard can also have different hardware components. One version of a server motherboard might include, for instance, hardware support for redundant array of inexpensive disks ("RAID"). Another variation of the same motherboard might include additional hardware network adapters or other differentiating hardware components.

Different platforms commonly require firmware containing different executable code and static data in order to support their operation. For example, and without limitation, different platforms might require different firmware drivers or different static data, such as interrupt request ("IRQ") routing tables, setup screens or defaults, and system management BIOS ("SMBIOS") data. A single firmware that supports multiple platforms is utilized in some computing systems. Such firmware can, however, be complex, difficult to test and maintain, bloated, and inefficient. As a result, such firmware can be unreliable and negatively impact the performance of computing systems that utilize such firmware.

Also, it is not uncommon for a customer of the OEM of the motherboard (e.g., a distributor incorporating the motherboard into a consumer electronic product) to request different functional features for the same platform for different end-user groups. A distributor may offer a full-featured computing system for end-users paying at a high price point, a mid-featured computing system with less features than the full-featured computing system for end-users paying at a medium price point, and a low-featured computing system with less features than the mid-featured computing system for end-users paying a low price point. And, distributors may sell computing systems in different regions which may require the enablement and/or disablement of certain features due to regional restrictions or requirements. Providing different features to different end-user groups, however, may require the OEM to develop a firmware binary for each end-user group. Each firmware binary may have different source code requiring additional development, testing, and maintenance. The additional development, testing, and maintenance can increase costs, introduce more defects, and increase the complexity of the firmware.

SUMMARY

Technologies are described herein for providing multi-user hidden features in a computer system firmware and enabling some or all of the multi-user hidden features for an end-user group. Through implementation of the disclosed technologies, development and distribution of firmware for a variety of end-user groups is possible using a single firmware binary, which can reduce development, maintenance, and distribution costs as development and distribution of multiple firmware binaries requires maintenance of significantly more code than a single firmware binary which can result in increased defects, development costs, and maintenance costs. Moreover, through implementation of the disclosed technologies, enablement of the multi-user hidden features can be limited to authorized end-users, reducing the use of such features by unauthorized users and reducing either errors in the firmware due to unauthorized use. Limiting use to authorized users also provides the benefit of decreased piracy of add-on firmware features typically sold for revenue.

In one configuration, a firmware receives data to enable a firmware feature, the received data including a feature authenticated variable and an end-user authenticated variable. The firmware may store the feature authenticated variable when the end-user authenticated variable is present in an authenticated variable data storage, such as a non-volatile random access memory ("NVRAM") accessible by the firmware. When the firmware receives a request to provide functionality associated with the firmware feature, the firmware may provide access to the functionality based at least in part on the presence of the feature authenticated variable in the authenticated variable data storage.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
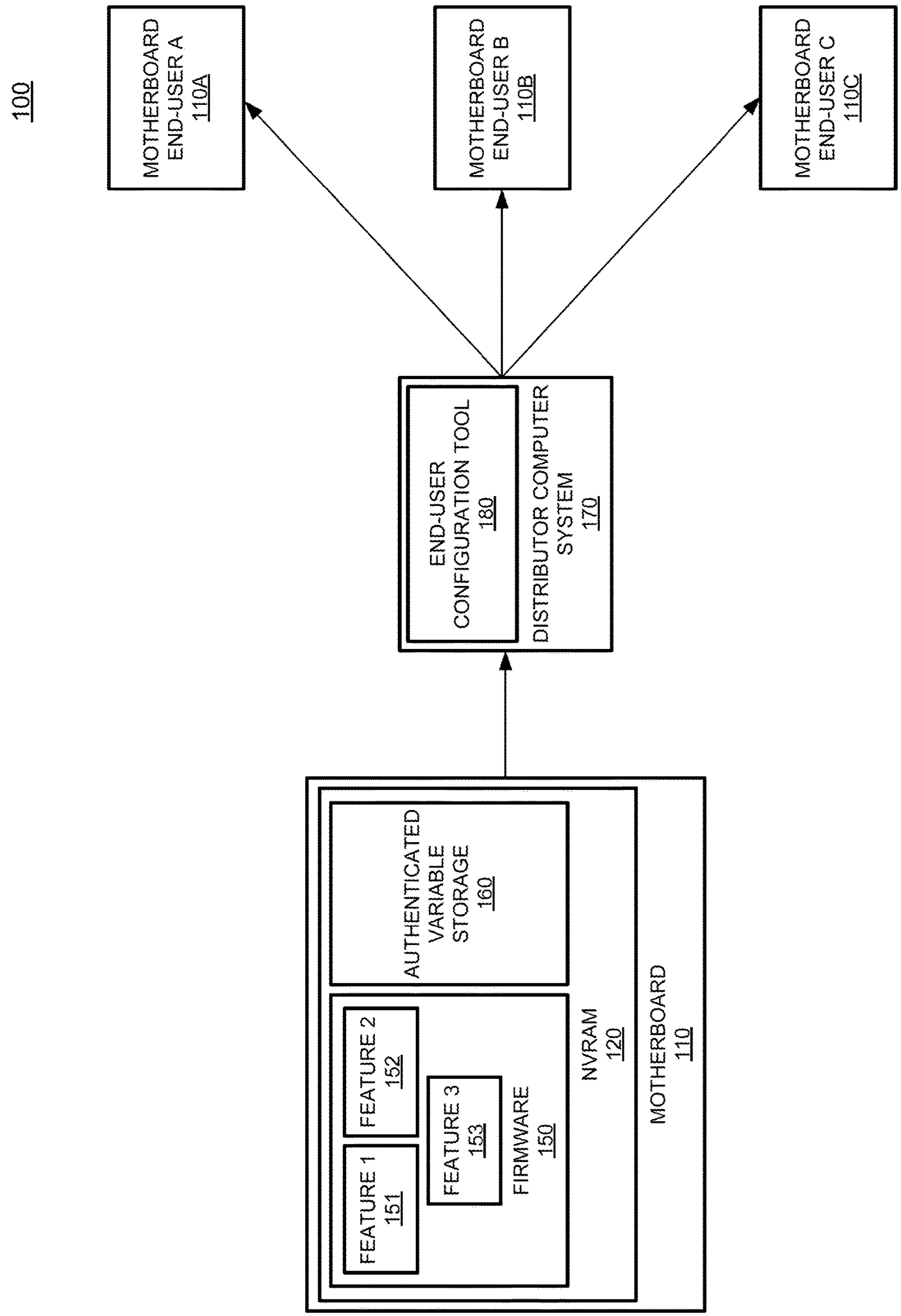
FIG. 1 is a diagram showing a high-level computer architecture for configuring motherboards implementing multi-user feature enablement for end-user groups consistent with disclosed configurations.

The following detailed description is directed to technologies for providing multi-user hidden features in a computer system firmware. In some implementations, the multi-user hidden features are enabled through the use of authenticated variables. When the firmware receives a request to provide functionality associated with a feature, the firmware may check for the presence of an authenticated variable enabling the feature. If the authenticated variable is present, the firmware provides access to requested functionality of the feature. The firmware may install the authenticated variable for the feature based at least in part on the presence of an authenticated variable associated with an end-user or end-user group and/or an authenticated variable associated with an identification number (e.g., a serial number) of the motherboard or computer system executing the firmware. In some configurations, the firmware complies with the Unified Extensible Firmware Interface ("UEFI") Specification, and the authenticated variables are created, set, and retrieved according to the UEFI Specification.

Through implementation of the disclosed technologies, development and distribution of firmware for a variety of end-user groups is possible using a single firmware binary. Traditionally, to supply differing feature sets to multiple end-user groups, the OEM of the developed and distributed firmware binaries for each end-user group, which could lead to increased development and maintenance costs. Using the disclosed technologies, one binary can be distributed to multiple end-user groups, and authenticated variables can act as a switch to turn the features on or off in instances of the firmware based at least in part on their presence.

Moreover, through implementation of the disclosed technologies, installation of the authenticated variables for the features can be limited to authorized end-users because installation of an authenticated variable for a feature is dependent on the presence of a separate authenticated variable associated with the end-user authorized to use that feature. When a distributor distributes the authenticated variable for the feature, it may also distribute an authenticated variable for the authorized end-user for the feature. The firmware will not install the authenticated variable for the feature unless it has access to an authorized variable matching the authenticated variable for the authorized end-user.

Through implementations of the technologies disclosed herein, a single firmware binary can support multiple features in a simple and efficient manner. These mechanisms can also reduce the time required for development and testing of computer system firmware for multiple end user groups (e.g., user groups paying at different price points or residing in different regions having computing requirements for their associated region) and, potentially, reduce the number of errors found in computer system firmware. Additional details regarding these aspects will be provided below with regard to FIGS. 1-6.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Aspects of the disclosed subject matter can be practiced on or in conjunction with other computer system configurations beyond those described, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a diagram showing a high-level computer architecture 100 for configuring motherboards implementing multi-user feature enablement for end-user groups consistent with disclosed configurations. The high-level computer architecture 100 includes a motherboard 110 and a distributor computer system 170. The motherboard 110 can include a motherboard designed and manufactured by an original equipment manufacturer ("OEM") that designs and manufactures motherboards according to specifications provided by distributors. The distributor computer system 170 can be a computer system, such as a desktop personal computer, a laptop personal computer system, a server computer system, or the like, operated and controlled by a distributor that requests motherboards from the OEM according to specifications. In some instances, the distributor may include motherboards manufactured by the OEM in computer systems or consumer electronics that are sold to end-users or consumers. For example, the distributor may make a desktop computer system for end-users that includes a motherboard manufactured by the OEM according to specifications provided by the distributor to the OEM, or the distributor may make a kitchen appliance with an embedded computer system that includes a motherboard manufactured by the OEM according to specifications.

The motherboard 110 shown in FIG. 1 includes a non-volatile random access memory ("NVRAM") 120. The NVRAM 120 can include a firmware 150 and an authenticated variable storage 160. According to some configurations, the firmware 150 can perform initialization of the computer's hardware during the boot process of a computer and load and perform setup operations for the operating system of the computer. The firmware 150 can include be a UEFI-complaint firmware, or a Basic Input/Output System (BIOS) firmware. In some configurations, the firmware 150 provides the functions and operations for an embedded computer system, such as an embedded computer system found in an automobile, a kitchen appliance, or television.

The firmware 150 can provide one or more features, such as feature 1 151, feature 2, 152, and feature 3 153. The features 151, 152, and 153 can include features such as support for various bus types (e.g., IEEE 1394, USB), localization (e.g., integrated language translations), hyper-threading, disk emulators, diagnostic utilities, and/or boot option configurations as just some examples. The features 151, 152, 153 may be non-essential in some configurations. For example, the features may be add-on features that a particular user or end-user group may purchase for additional money.

Consistent with the UEFI specification, the NVRAM 120 can include an area for storing authenticated variables, such as the authenticated variable storage 160 shown in FIG. 1. The authenticated variable storage 160 may store one or more authenticated variables set through set variable application programming interfaces ("APIs") made available by the firmware 150 and/or the operating system of the computer in which the motherboard 110 is installed. Traditionally, authenticated variables stored in authenticated variable storage 160 may include, for example, variables associated with securely booting the computer in which the motherboard 110 is installed by enabling or disabling certain features within the firmware 150.

Authenticated variables may differ from non-authenticated variables in some configurations because authenticated variables may be encrypted and cannot be set within the NVRAM 120 unless the firmware 150 has access to a key which can be used to decrypt the authenticated variable. In contrast, a non-authenticated variable may be set without the need for a key. In some configurations, a computer can create an authenticated variable by encrypting a variable with a private key that is part of a public-private key pair, and the firmware 150 may have access to the public key of the public-private key pair. When the firmware 150 receives the authenticated variable, it may attempt to decrypt it using the public key.

Consistent with disclosed configurations, authenticated variables may be used by the firmware 150 to enable and disable one or more of features 151, 152, and 153. For example, the source code for the firmware 150 may check for the presence, or the setting, of an authenticated variable before enabling functionality. As just one example, the firmware 150 may provide a feature associated with hyperthreading. Before allowing or exposing access to the hyperthreading feature, the firmware 150 may check the authenticated variable storage 160 for the presence of an authenticated variable associated with the hyperthreading feature. If the authenticated variable for the hyperthreading feature is present within the authenticated variable storage 160 and/or set to be enabled, then the firmware 150 will enable hyperthreading functionality.

As an example, feature 1 151, feature 2 152, and feature 3 153, as shown in FIG. 1, are add-on features which are not enabled by default. As such, firmware 150 may check for the presence of authenticated variables associated with each of the features 151, 152, and 153 before exposing their functionality.

In some configurations, the OEM manufactures the motherboard 110 with the firmware 150 having a full feature set but without the authenticated variables needed to expose the full feature set. Using the example high-level computer architecture 100, the full feature set may include all of the features 151, 152, 153. As shown in FIG. 1, the firmware 150 manufactured by the OEM includes the features 151, 152, 153 but does not store any authenticated variables in the authenticated variable storage 160 enabling them. Instead, addition of authenticated variables to the authenticated variable storage 160 may be performed by the distributor.

By including the full feature set in the firmware 150 and allowing distributors to enable one or more of the features using authenticated variables, an OEM need only design, develop, test, and deploy one version of the firmware 150 and one version of the motherboard 110 to satisfy multiple end-user groups of the distributor. As one version of the firmware 150 is being developed and tested, the OEM's development costs can be reduced and the complexity of development may be also be reduced.

The distributor may service multiple end-user groups where each end-user group buys systems with the motherboard 110, and the end-user groups may have differing feature needs or requirements. For example, the end-user groups may be in different countries or regions and require different localization features. The end-user groups may pay different prices for differing feature sets. For example, a developer or technical end-user group may desire the full feature set, while a home consumer may not need the full feature set and may not want to pay for the full feature set. Accordingly, the developer may offer different end-user groups different firmware features based on price point—a technical end-user group may pay more than a consumer end-user group to have the full feature set, and the consumer end-user group may pay less than the technical end-user group and receive less than the full feature set.

According to some configurations, distributors may add the authenticated variables for enabling the features 151, 152, 153 using the distributor computer system 170. The distributor computer system 170 may include an end-user configuration tool 180 which can perform functions and operations to create authenticated variables associated with features and install them within the authenticated variable storage 160 of the motherboard 110. The end-user configuration tool 180 may access a private encryption key for creating the authenticated variables and install the associated public key in the NVRAM 120 for access by the firmware 150 in some configurations.

The end-user configuration tool 180 may also create an authenticated variable associated with each end-user and install it in authenticated variable storage. Consistent with disclosed configurations, feature authenticated variables may not be added or decrypted unless the firmware 150 has access to an authenticated variable associated with the end-user group which may be provided with the authenticated variable for the feature.

Figure 2:
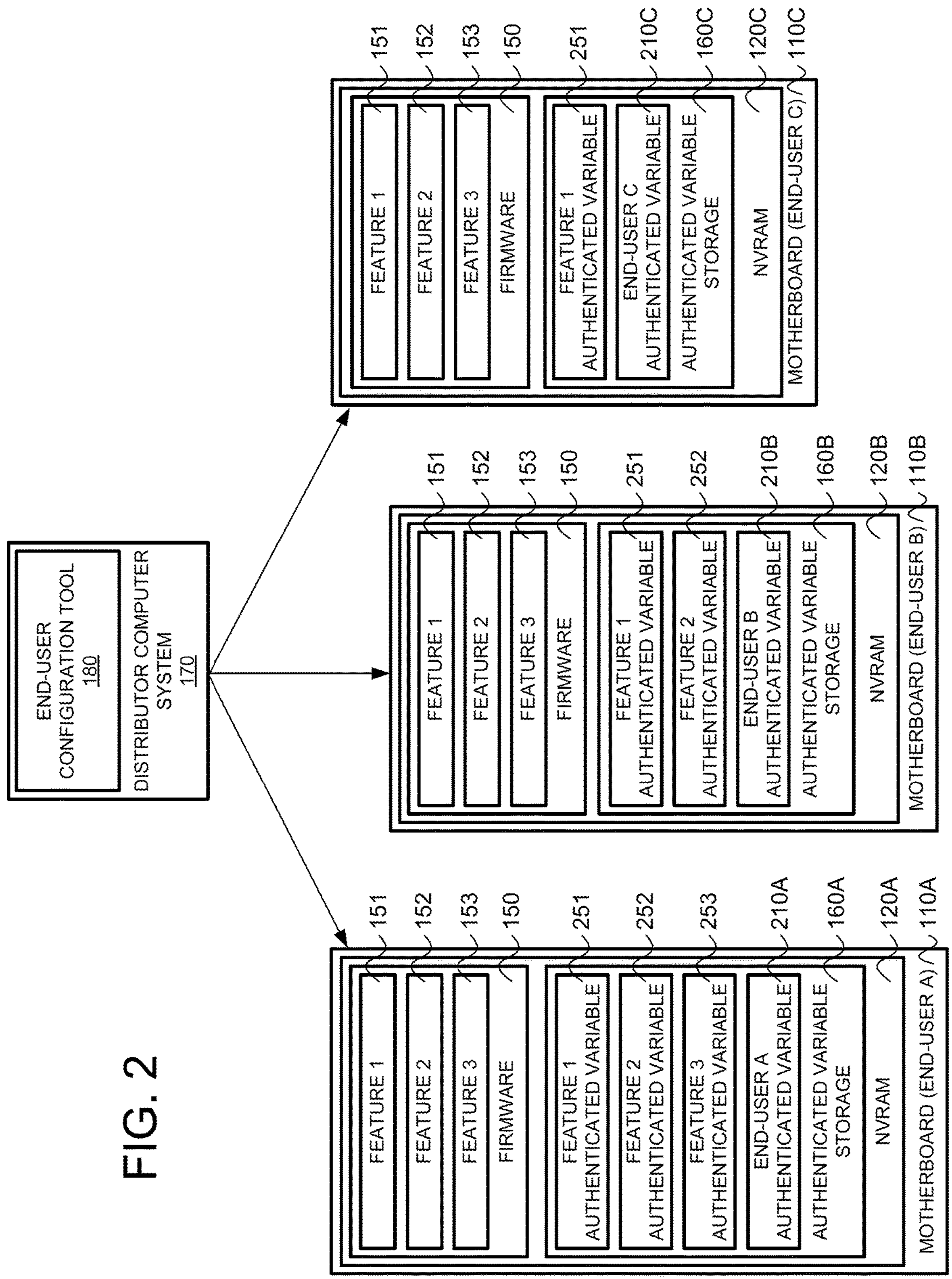
FIG. 2 is a diagram showing a high-level computer architecture for configuring motherboards for end-user groups consistent with disclosed configurations.

As shown in FIG. 1, the distributor computer system 170 may configure a motherboard end-user group A 110A, motherboard end-user group B 110B, and motherboard end-user group C 110C using the end-user configuration tool 180. Each of the motherboard end-user group A 110 A, the motherboard end-user group B 110B, and the motherboard end-user group C 110C represent motherboards 110 associated with a different end-user group having differing needs for firmware features and configured differently to address those differing needs for firmware features. FIG. 2 shows more detail regarding the configuration of each of the motherboard end-user group A 110 A, the motherboard end-user group B 110B, and the motherboard end-user group C 110C.

As shown in FIG. 2, the motherboard end-user group A 110 A, the motherboard end-user group B 110B, and the motherboard end-user group C 110C each have installed within their authenticated variable storage 160 authenticated variables for enabling the features 151, 152, 153 in the firmware 150. Notably, each of the motherboard end-user group A 110 A, the motherboard end-user group B 110B, and the motherboard end-user group C 110C have the same firmware 150—the firmware 150 includes source code for providing feature 1 151, feature 2 152, and feature 3 153. But, each of the motherboard end-user group A 110 A, the motherboard end-user group B 110B, and the motherboard end-user group C 110C have different authenticated variables stored in their respective authenticated variable storage 160 and as a result each of the motherboard end-user group A 110 A, the motherboard end-user group B 110B, and the motherboard end-user group C 110C provide different features.

For example, motherboard end-user group A 110A includes authenticated variable storage 160A which includes feature 1 authenticated variable 251, feature 2 authenticated variable 2 252 and feature 3 authenticated variable 3. As such, motherboard end-user group A 110A provides feature 1 151, feature 2 152, and feature 3 153. Authenticated variable storage 160A of motherboard end-user group A 110A also includes end-user A authenticated variable 210A.

Also, motherboard end-user group B 110B includes authenticated variable storage 160B which includes feature 1 authenticated variable 251 and feature 2 authenticated variable 2 252. As such, motherboard end-user group B 110B provides feature 1 151 and feature 2 152 but not feature 3 153. Authenticated variable storage 160B of motherboard end-user group B 110B also includes end-user B authenticated variable 210B.

And, motherboard end-user group C 110C includes authenticated variable storage 160C which includes feature 1 authenticated variable 251. As such, motherboard end-user group C 110C provides feature 1 151 but neither feature 2 152 nor feature 3 153. Authenticated variable storage 160C of motherboard end-user group C 110C also includes end-user C authenticated variable 210C.

Although not shown in FIGS. 1 and 2, authenticated variable storage 160 may also include an authenticated variable associated with a unique identifier, such as a serial number, of the motherboard 110. By using an authenticated variable associated with a unique identifier of the motherboard 110, features can be enabled on a specific motherboard level as opposed to an end-user group level. The ability to enable a feature at a specific motherboard level—as opposed to an end-user group level—can provide additional options for distributors. For example, distributors may be able to customize feature sets for individual end-user customers, or provide demonstration motherboards 110 that include specific enabled add-on features.

In some cases, end-user groups, or specific end-users may wish to upgrade the feature set for their motherboards 110. Consistent with disclosed configurations, the end-user configuration tool may provide additional features to already configured motherboards 110 by supplying the motherboards with the authenticated variable needed to enable the feature, thereby unlocking the feature for a particular end-user group or a specific end-user.

Figure 3:
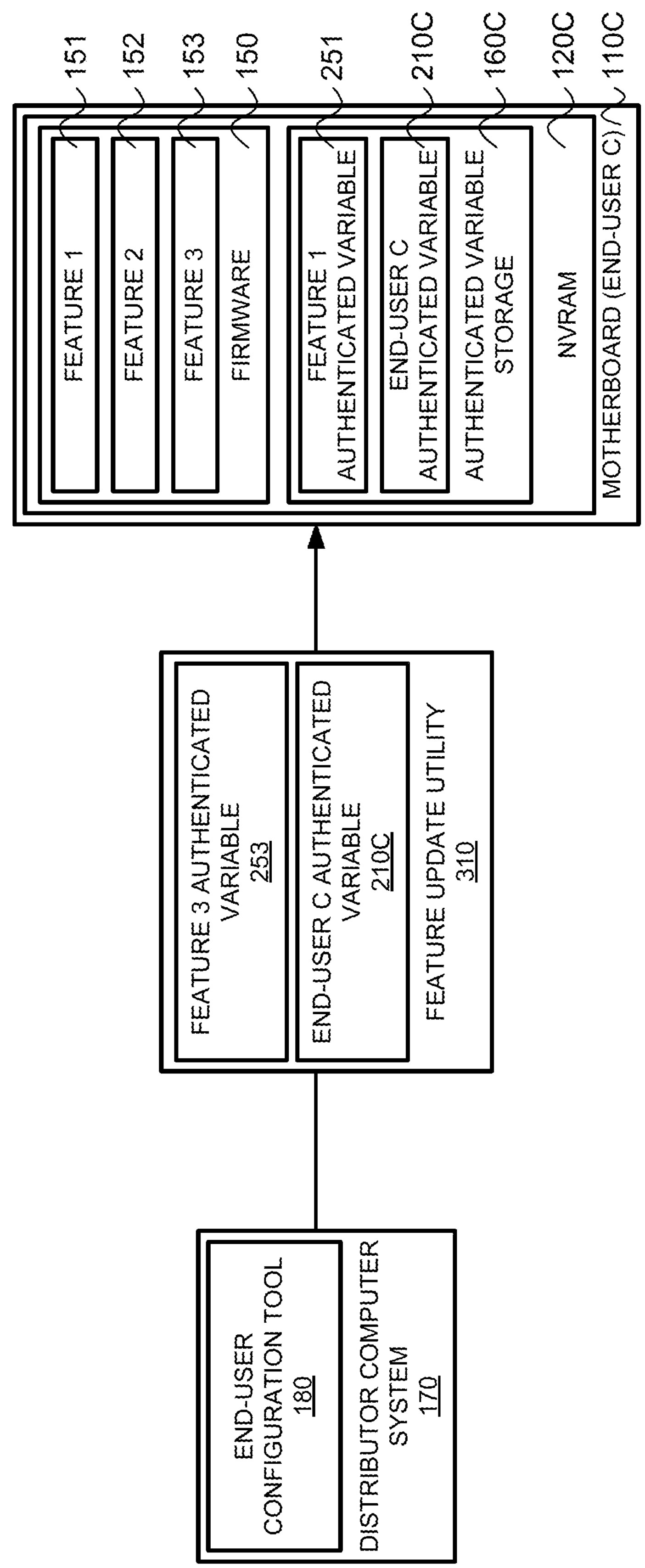
FIG. 3 is a diagram showing a high-level computer architecture for modifying a configuration of a motherboard for an end-user group consistent with disclosed configurations.

FIG. 3 is a diagram showing a high-level computer architecture 300 for modifying a configuration of a motherboard for an end-user group consistent with disclosed configurations. As shown in the high-level computer architecture 300, the distributor computer system 170 may execute the end-user configuration tool 180 to provide a feature update utility 310 to a motherboard. The feature update utility 310 may include an executable or script that performs operations for enabling an add-on feature. In the case of FIG. 3, the motherboards are the motherboards for end-user group C 110C. The feature update utility 310 is provided to the motherboard end-user group C 110C with at least two authenticated variables—the feature authenticated variable (e.g., feature 3 authenticated variable 253) and the end-user authenticated variable (e.g., end-user C authenticated variable 210 C). In configurations where features may be enabled on a specific motherboard level, the feature update utility may also include a serial number authenticated variable (not shown) or some other unique identifier authenticated variable associated with the motherboard (not shown).

When the motherboard end-user group C receives the feature update utility 310, it may execute it (e.g., due to a user initializing execution of feature update utility 310 or through an automated process such as an operating system update). The feature update utility 310 may include code that calls a set variable API of the operating system for the computer in which the motherboard end-user group C is installed. The set variable method of the OS may, in turn, call the set variable function of the firmware 150 and pass into it the feature 3 authenticated variable 253 and the end-user authenticated variable 210C. The set variable function of the firmware 150 may attempt to decrypt the end-user authenticated variable 210C and compare it to the end-user authenticated variable it has stored in its authenticated variable storage. If there is a match, the firmware 150 will install the feature authenticated variable. If unsuccessful, the firmware 150 will not install the feature 2 authenticated variable 253.

Although not shown in FIG. 3, the feature update utility 310 may also include an authenticated variable associated with the motherboard end-user group C 110C, such as a serial number authenticated variable and the firmware 150 may attempt to decrypt the serial number authenticated variable in addition to, or in lieu of, the end-user C authenticated variable 210C. If the decryption fails, then the firmware 150 will not install the feature 3 authenticated variable 253.

In some configurations, the feature authenticated variable and the end-user authenticated variable may be part of a data structure or package that the end-user configuration tool 180 encrypts together, and the firmware 150 may attempt to decrypt the data structure or package. If the decryption is successful, it may parse the data structure or package to identify the feature authenticated variable and the end-user authenticated variable. In some configurations, the end-user configuration tool 180 encrypts the feature authenticated variable and the end-user authenticated variable separately, and the firmware, likewise, decrypts them separately. The packaging format of both the feature authenticated variable and the end-user group authenticated variable may vary from configuration to configuration without departing from the spirit and scope of disclosed configurations.

Figure 4:
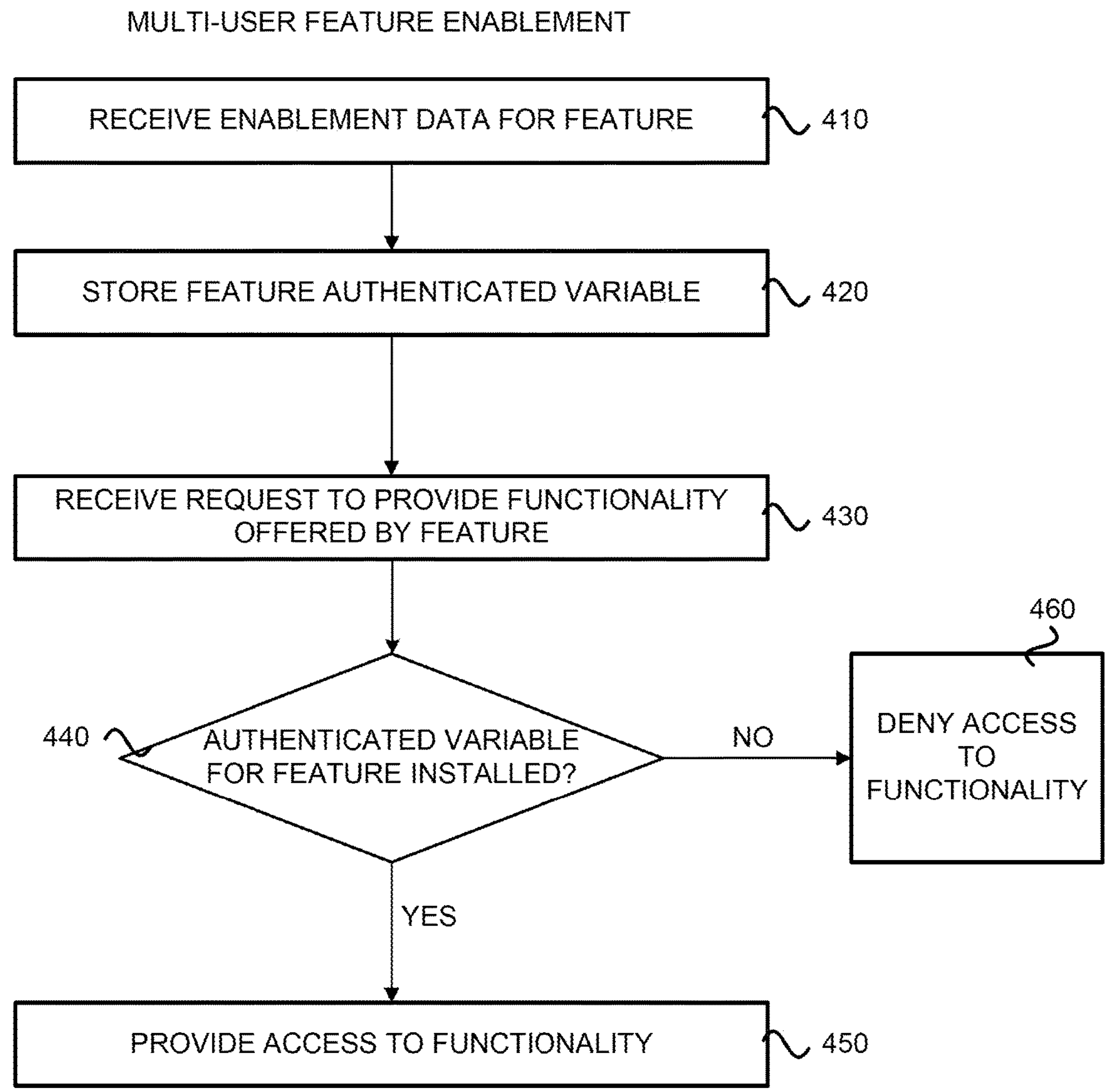
FIG. 4 is a flow diagram showing a routine for multi-user feature enablement consistent with disclosed configurations.

FIG. 4 is a flow diagram showing a multi-user feature enablement routine 400 consistent with disclosed configurations. According to some configurations, the firmware 150 performs multi-user feature enablement routine 400. It should be appreciated that the logical operations described herein with respect to FIG. 4, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. Some or all of these operations can also be performed by components other than those specifically identified.

The multi-user feature enablement routine 400 begins at operation 410 where the firmware receives enablement data for a feature. Consistent with disclosed configurations, the enablement data can include a feature authenticated variable and an end-user authenticated variable. Both the feature authenticated variable and the end-user authenticated variable may be included in a data structure and signed together with a private key. The firmware may attempt to decrypt the signed data structure with its version of the public key in the public-private key pair of the private key. If successful, the firmware parses the data structure when moving to operation 420.

In some configurations, the feature authenticated variable may be signed with a private key and the end-user authenticated variable be separately signed with the private key. In such configurations, the firmware attempts to decrypt the end-user authenticated variable with its public key in the public-private key pair of the private key. If successful, processing moves to operation 420. According to some configurations, the firmware performing the multi-user feature enablement routine 400 may be a UEFI-specification complaint firmware and the encryption of the enablement data and/or the feature authenticated variable and the end-user authenticated variable may be performed consistent with the UEFI specification.

As noted above, in some configurations, features can be enabled based on a motherboard specific authenticated variable, such as a serial number authenticated variable. In such configurations, the enablement data will further include a serial number authenticated variable consistent with disclosed embodiments.

After the firmware receives the enablement data, it may store the feature authenticated variable in the NVRAM of the motherboard (e.g., in the authenticated variable storage of the NVRAM) at operation 420. Consistent with disclosed configurations, storage of the feature authenticated variable may be contingent on whether the received enablement data includes an authenticated variable corresponding to an end-user authenticated variable that is already present and/or enabled in the NVRAM (e.g., in the authenticated variable storage). For example, the firmware may attempt to retrieve an end-user value from the NVRAM.

If the NVRAM accessible by the firmware includes an authenticated variable matching the end-user authenticated variable, then the firmware may add the feature authenticated variable to the NVRAM or the authenticated variable storage in some configurations. As mentioned above, in some configurations, features may be added on a motherboard specific basis. In such configurations, the received feature enablement data may include an authenticated variable corresponding to an individual motherboard such as an authenticated serial number variable. In such configurations, the firmware will store the feature authenticated variable in the NVRAM when the serial number authenticated variable matches an authenticated variable in the NVRAM, or when the serial number authenticated variable matches an authenticated variable in the NVRAM and the end-user authenticated variable of the received enablement data matches an authenticated variable in the NVRAM.

At operation 430, the firmware may receive a request to provide functionality offered by a feature and if an authenticated variable is present and/or enabled for the feature then the firmware may provide access to the requested functionality at operation 450. In some configurations, the firmware may attempt to retrieve a firmware feature value from the authenticated variable storage corresponding to the requested feature. For example, an application executing on a computer system in which a motherboard with the firmware is installed may make a request to access an IEEE 1394 port. The request from the application may indirectly call a firmware function to access an IEEE 1394 port, which may be an add-on feature in some configurations.

The firmware may then check for the presence of an authenticated variable corresponding to IEEE 1394 port functionality in its authenticated variable storage, or may check to determine the authenticated variable corresponding to IEEE 1394 port functionality is enabled. If the authenticated variable corresponding to the IEEE 1394 functionality is present and/or enabled (operation 440:YES), then the firmware will provide the functionality at operation 450. But, if the authenticated variable is not present (operation 440:NO), then the firmware will deny access to the functionality (operation 460) and will not perform operation 440. Although the above example uses the example of functionality related to the availability of an IEEE 1394 port, the request for functionality received at operation 430 and provided in operation 450 (or not provided in operation 460) may be a firmware feature.

Figure 5:
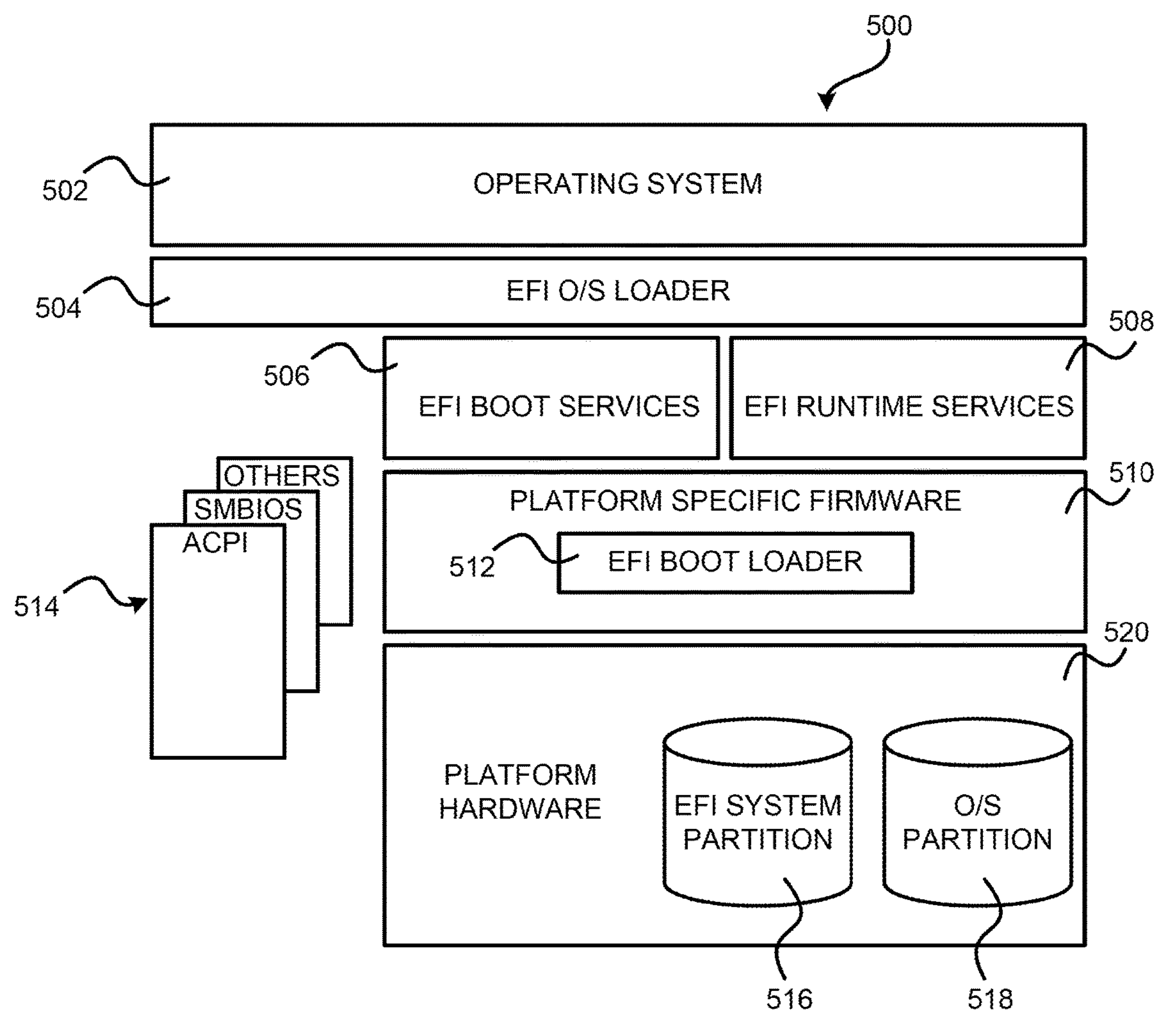
FIG. 5 is a software architecture diagram illustrating a software architecture for a Unified Extensible Firmware Interface ("UEFI") Specification-compliant firmware that provides an operating environment consistent with disclosed configurations.

Turning now to FIG. 5, a software architecture diagram will be described that illustrates an architecture for a UEFI Specification-compliant firmware that can implement the technologies disclosed herein. The UEFI Specification describes an interface between an operating system 502 and a UEFI Specification-compliant firmware. The UEFI Specification also defines an interface that the firmware can implement, and an interface that the operating system 502 can use while booting. How the firmware implements the interface can be left up to the manufacturer of the firmware. The UEFI Specification also defines a way for the operating system 502 and firmware to exchange information necessary to support the operating system boot process. The term "UEFI Specification" used herein refers to both the EFI Specification developed by INTEL CORPORATION and the UEFI Specification managed by the UEFI FORUM.

As shown in FIG. 5, the architecture can include platform hardware 520 and an operating system 502. The operating system ("OS" or "O/S") image can be retrieved from the UEFI system partition 516 using an UEFI operating system loader 504. The UEFI system partition 516 can be an architecturally shareable system partition. As such, the UEFI system partition 516 can define a partition and file system designed to support safe sharing of mass storage between multiple vendors. An OS partition 518 can also be utilized.

Once started, the UEFI OS loader 504 can continue to boot the complete operating system 502. In doing so, the UEFI OS loader 504 can use UEFI boot services 506, an interface to other supported specifications to survey, comprehend, and initialize the various platform components and the operating system software that manages them. Thus, interfaces 514 from other specifications can also be present on the system. For example, the Advanced Configuration and Power Management Interface ("ACPI") and the System Management BIOS ("SMBIOS") specifications can be supported.

UEFI boot services 506 can provide interfaces for devices and system functionality used during boot time. UEFI runtime services 508 can also be available to the UEFI OS loader 504 during the boot phase. For example, a set of runtime services can be presented to ensure appropriate abstraction of base platform hardware resources used by the operating system 502 during its operation. UEFI allows extension of platform firmware by loading UEFI driver and UEFI application images which, when loaded, have access to UEFI-defined runtime and boot services.

Additional details regarding the operation and architecture of a UEFI Specification compliant firmware can be found in the UEFI Specification which is available from INTEL CORPORATION. INTEL CORPORATION has also provided further details regarding recommended implementation of EFI and UEFI in the form of The INTEL Platform Innovation Framework for EFI ("the Framework"). Unlike the UEFI Specification, which focuses only on programmatic interfaces for the interactions between the operating system and system firmware, the Framework is a group of specifications that together describe a firmware implementation that has been designed to perform the full range of operations that are required to initialize the platform from power on through transfer of control to the operating system. Both the UEFI Specification and the specifications that make up the Framework, which are also available from INTEL CORPORATION, are expressly incorporated herein by reference.

Figure 6:
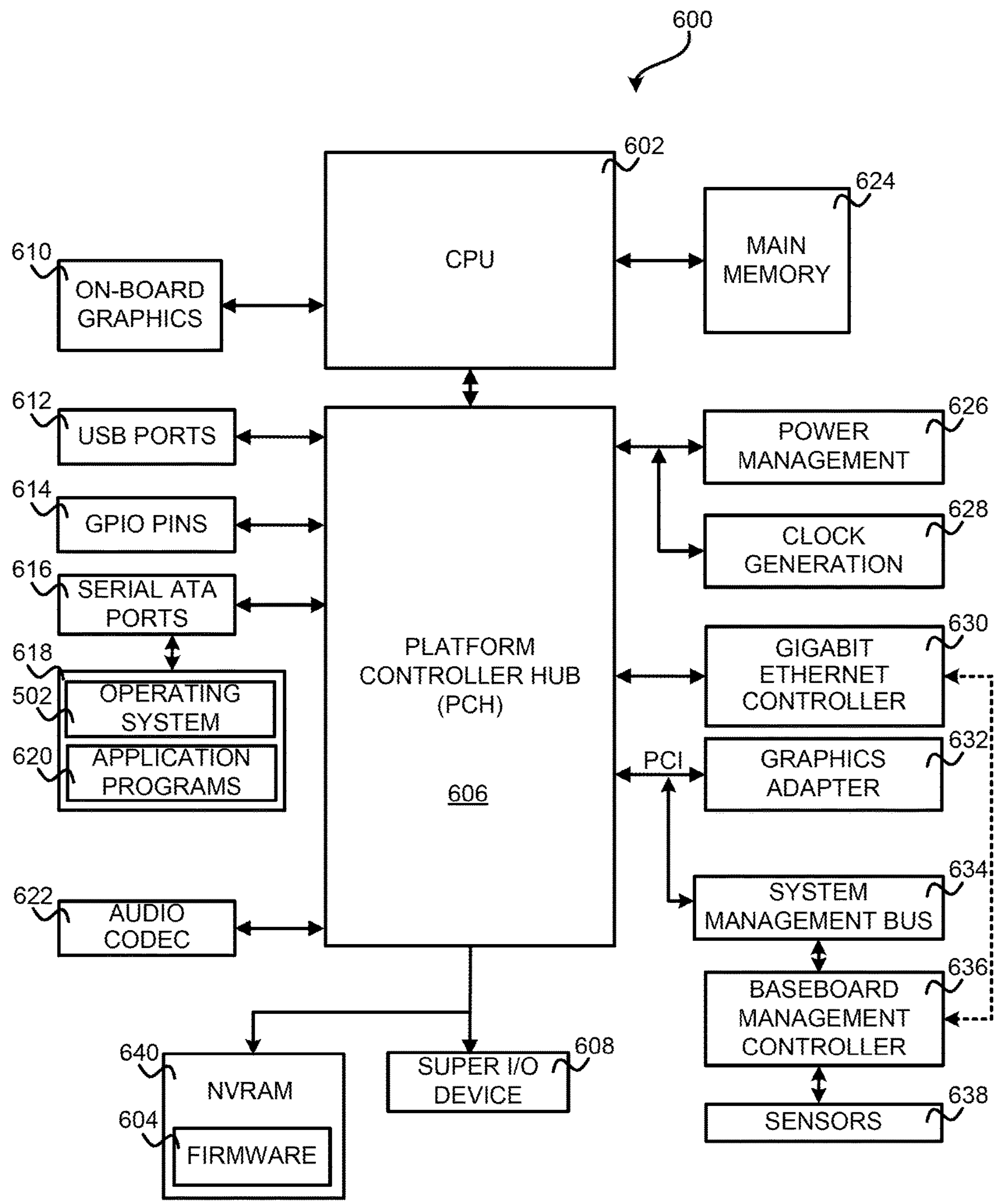
FIG. 6 is a computer architecture diagram that shows an illustrative architecture for a computer that can provide an operating environment consistent with disclosed configurations.

Referring now to FIG. 6, a computer architecture diagram that illustrates an illustrative architecture for a computer that can provide an illustrative operative environment for the technologies presented herein will be described. FIG. 6 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including hand-held devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 6 shows an illustrative computer architecture for a computer 600 that can be utilized in the implementations described herein. The illustrative computer architecture shown in FIG. 6 is for the computer 600 that includes a baseboard, or "motherboard", which is a printed circuit board to which a multitude of components or devices can be connected by way of a system bus or other electrical communication path. In one illustrative configuration, a central processing unit ("CPU") 602 operates in conjunction with a Platform Controller Hub ("PCH") 606. The CPU 602 is a central processor that performs arithmetic and logical operations necessary for the operation of the computer 600. The computer 600 can include a multitude of CPUs 602. Each CPU 602 might include multiple processing cores.

The CPU 602 provides an interface to a random access memory ("RAM") used as the main memory 624 in the computer 600 and, possibly, to an on-board graphics adapter 632. The PCH 606 provides an interface between the CPU 602 and the remainder of the computer 600.

The PCH 606 can also be responsible for controlling many of the input/output functions of the computer 600. In particular, the PCH 606 can provide one or more universal serial bus ("USB") ports 612, an audio codec 622, a Gigabit Ethernet Controller 630, and one or more general purpose input/output ("GPIO") pins 614. The USB ports 612 can include USB 2.0 ports, USB 3.0 ports and USB 3.1 ports among other USB ports. The audio codec 622 can include Intel High Definition Audio, Audio Codec '97 ("AC '97") and Dolby TrueHD among others.

The PCH 606 can also include functionality for providing networking functionality through a Gigabit Ethernet Controller 630. The Gigabit Ethernet Controller 630 is capable of connecting the computer 600 to another computer via a network. Connections which can be made by the Gigabit Ethernet Controller 630 can include LAN or WAN connections. LAN and WAN networking environments are commonplace in offices, enterprise-wide computer networks, intranets, and the Internet.

The PCH 606 can also provide a bus for interfacing peripheral card devices such as a graphics adapter 632. In one configuration, the bus comprises a PCI bus. The PCI bus can include a Peripheral Component Interconnect ("PCI") bus, a Peripheral Component Interconnect eXtended ("PCI-X") bus and a Peripheral Component Interconnect Express ("PCIe") bus among others.

The PCH 606 can also provide a system management bus 634 for use in managing the various components of the computer 600. Additional details regarding the operation of the system management bus 634 and its connected components are provided below. Power management circuitry 626 and clock generation circuitry 628 can also be utilized during the operation of the PCH 606.

The PCH 606 is also configured to provide one or more interfaces for connecting mass storage devices to the computer 600. For instance, according to a configuration, the PCH 606 includes a serial advanced technology attachment ("SATA") adapter for providing one or more serial ATA ports 616. The serial ATA ports 616 can be connected to one or more mass storage devices storing an OS, such as OS 502 and application programs, such as a SATA disk drive 618. As known to those skilled in the art, an OS comprises a set of programs that control operations of a computer and allocation of resources. An application program is software that runs on top of the operating system software 502, or other runtime environment, and uses computer resources to perform application specific tasks desired by the user.

According to one configuration, the OS 502 comprises the LINUX operating system. According to another configuration, the OS 502 comprises the WINDOWS operating system from MICROSOFT CORPORATION. According to another configuration, the OS 502 comprises the UNIX operating system. It should be appreciated that other operating systems can also be utilized.

The mass storage devices connected to the PCH 606, and their associated computer-readable storage media, provide non-volatile storage for the computer 600. Although the description of computer-readable storage media contained herein refers to a mass storage device, such as a hard disk or CD-ROM drive, it should be appreciated by those skilled in the art that computer-readable storage media can be any available media that can be accessed by the computer 600.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 600.

A low pin count ("LPC") interface can also be provided by the PCH 606 for connecting a Super I/O device 608. The Super I/O device 608 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 640 for storing firmware 604 that includes program code containing the basic routines that help to start up the computer 600 and to transfer information between elements within the computer 600.

It should be appreciated that the program modules disclosed herein, including the firmware 604, can include software instructions that, when loaded into the CPU 602 and executed, transform a general-purpose computer 600 into a special-purpose computer 600 customized to facilitate all, or part of, the operations disclosed herein. As detailed throughout this description, the program modules can provide various tools or techniques by which the computer 600 can participate within the overall systems or operating environments using the components, logic flows, and/or data structures discussed herein.

The CPU 602 can be constructed from any number of transistors or other circuit elements, which can individually or collectively assume any number of states. More specifically, the CPU 602 can operate as a state machine or finite-state machine. Such a machine can be transformed to a second machine, or a specific machine, by loading executable instructions contained within the program modules. These computer-executable instructions can transform the CPU 602 by specifying how the CPU 602 transitions between states, thereby transforming the transistors or other circuit elements constituting the CPU 602 from a first machine to a second machine, wherein the second machine can be specifically configured to perform the operations disclosed herein. The states of either machine can also be transformed by receiving input from one or more user input devices, network interfaces (such as the Gigabit Ethernet Controller 630), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to: the technology used to implement the storage media, whether the storage media are characterized as primary or secondary storage, and the like. For example, if the storage media are implemented as semiconductor-based memory, the program modules can transform the physical state of the semiconductor main memory 624 and/or NVRAM 640. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described briefly above, the PCH 606 can include a system management bus 634. The system management bus 634 can include a Baseboard Management Controller ("BMC") 636. In general, the BMC 636 is a microcontroller that monitors operation of the computer 600. In a more specific configuration, the BMC 636 monitors health-related aspects associated with the computer 600, such as, but not limited to, the temperature of one or more components of the computer 600, speed of rotational components (e.g., spindle motor, CPU fan, etc.) within the computer 600, the voltage across or applied to one or more components within the computer 600, and the available and/or used capacity of memory devices within the computer 600. To accomplish these monitoring functions, the BMC 636 is communicatively connected to one or more components by way of the system management bus 634.

In one configuration, these components include sensor devices 638 for measuring various operating and performance-related parameters within the computer 600. The sensor devices 638 can be either hardware or software based components configured or programmed to measure or detect one or more of the various operating and performance-related parameters.

The BMC 636 functions as the master on the system management bus 634 in most circumstances, but can also function as either a master or a slave in other circumstances. Each of the various components communicatively connected to the BMC 636 by way of the system management bus 634 is addressed using a slave address. The system management bus 634 is used by the BMC 636 to request and/or receive various operating and performance-related parameters from one or more components, which are also communicatively connected to the system management bus 634.

It should be appreciated that the functionality provided by the computer 600 can be provided by other types of computing devices, including hand-held computers, embedded computer systems, personal digital assistants, and other types of computing devices known to those skilled in the art. It is also contemplated that the computer 600 might not include all of the components shown in FIG. 6, can include other components that are not explicitly shown in FIG. 6, or might utilize an architecture completely different than that shown in FIG. 6.

Based on the foregoing, it should be appreciated that technologies for enabling multi-user hidden features of firmware using authenticated variables have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer-implemented method comprising:

receiving data to enable a firmware feature that defines a functionality of a firmware, the received data including a feature authenticated variable and an end-user authenticated variable;

storing the feature authenticated variable when the end-user authenticated variable corresponds to a second end-user authenticated variable extant in an authenticated variable data storage;

receiving a request to provide the functionality defined by the firmware feature; and providing access to the functionality defined by the firmware feature when the feature authenticated variable is present in the authenticated variable data storage.

2. The computer-implemented method of claim 1 further comprising preventing storage of the feature authenticated variable when the end-user authenticated variable is not present in the authenticated variable data storage.

3. The computer-implemented method of claim 1 further comprising preventing access to the functionality when the feature authenticated variable is not present in the authenticated variable data storage.

4. The computer-implemented method of claim 1 wherein the received data further includes a serial number authenticated variable.

5. The computer-implemented method of claim 4 further comprising storing the serial number authenticated variable when the end-user authenticated variable and the serial number authenticated variable are present in the authenticated variable data storage.

6. The computer-implemented method of claim 5 further comprising preventing storage of the feature authenticated variable when the end-user authenticated variable or the serial number authenticated variable is not present in the authenticated variable data storage.

7. The computer-implemented method of claim 1 wherein the authenticated variable data storage is a non-volatile random access memory ("NVRAM").

8. The computer-implemented method of claim 1 wherein the feature authenticated variable and the end-user authenticated variable have been signed jointly, in a single data structure, using a same private key.

9. A non-transitory computer-readable storage medium storing computer-executable instructions that when executed by a computer, cause the computer to perform operations comprising:

receiving data to enable a feature that defines a functionality of a firmware, the received data including a feature authenticated variable and an end-user authenticated variable;

storing the feature authenticated variable when the end-user authenticated variable corresponds to a second end-user authenticated variable extant in a non-volatile random access memory ("NVRAM") of the computer;

receiving a request to provide the functionality defined by the feature; and providing access to the functionality defined by the feature when the feature authenticated variable is present in the NVRAM of the computer.

10. The non-transitory computer-readable storage medium of claim 9 wherein the operations further comprise preventing storage of the feature authenticated variable when the end-user authenticated variable is not present in the NVRAM.

11. The non-transitory computer-readable storage medium of claim 9 wherein the operations further comprise preventing access to the functionality when the feature authenticated variable is not present in the NVRAM.

12. The non-transitory computer-readable storage medium of claim 9 wherein the received data further includes a serial number authenticated variable.

13. The non-transitory computer-readable storage medium of claim 12 wherein the operations further comprise storing the serial number authenticated variable when the end-user authenticated variable and the serial number authenticated variable are present in the NVRAM.

14. The non-transitory computer-readable storage medium of claim 13 wherein the operations further comprise preventing storage of the feature authenticated variable when the end-user authenticated variable or the serial number authenticated variable is not present in the NVRAM.

15. The non-transitory computer-readable storage medium of claim 9 wherein the feature authenticated variable and the end-user authenticated variable have been signed jointly, in a single data structure, using the private key.

16. A computer-implemented method comprising:

parsing firmware feature enablement data to determine a feature authenticated variable and an end-user authenticated variable;

attempting to retrieve, from a non-volatile random access memory ("NVRAM") of a computer, an end-user value for the end-user authenticated variable;

storing the feature authenticated variable at least in response to retrieving the end-user authenticated variable from the NVRAM;

receiving a request to provide functionality defined by a firmware feature of a firmware, wherein enablement of the firmware feature is dependent upon the feature authenticated variable;

attempting to retrieve, from the NVRAM of the computer, a feature value for the feature authenticated variable; and providing access to the functionality defined by the firmware feature based at least in part on a successful attempt to retrieve the feature authenticated variable from the NVRAM.

17. The computer-implemented method of claim 16 wherein the firmware feature enablement data further includes a serial number authenticated variable.

18. The computer-implemented method of claim 17 further comprising storing the serial number authenticated variable based at least in part on a successful attempt to retrieve the end-user authenticated variable and the serial number authenticated variable from the NVRAM.

19. The computer-implemented method of claim 18 wherein the feature authenticated variable, the end-user authenticated variable, and the serial number authenticated variable have been signed using a same private key.

20. The computer-implemented method of claim 16 wherein the feature authenticated variable and the end-user authenticated variable have been signed jointly, in a single data structure, using the private key.

* * * * *